(No Model.)
R. H. DIMOCK & J. A. ROBINSON.
OIL BURNER.
No. 286,914. Patented Oct. 16, 1883.
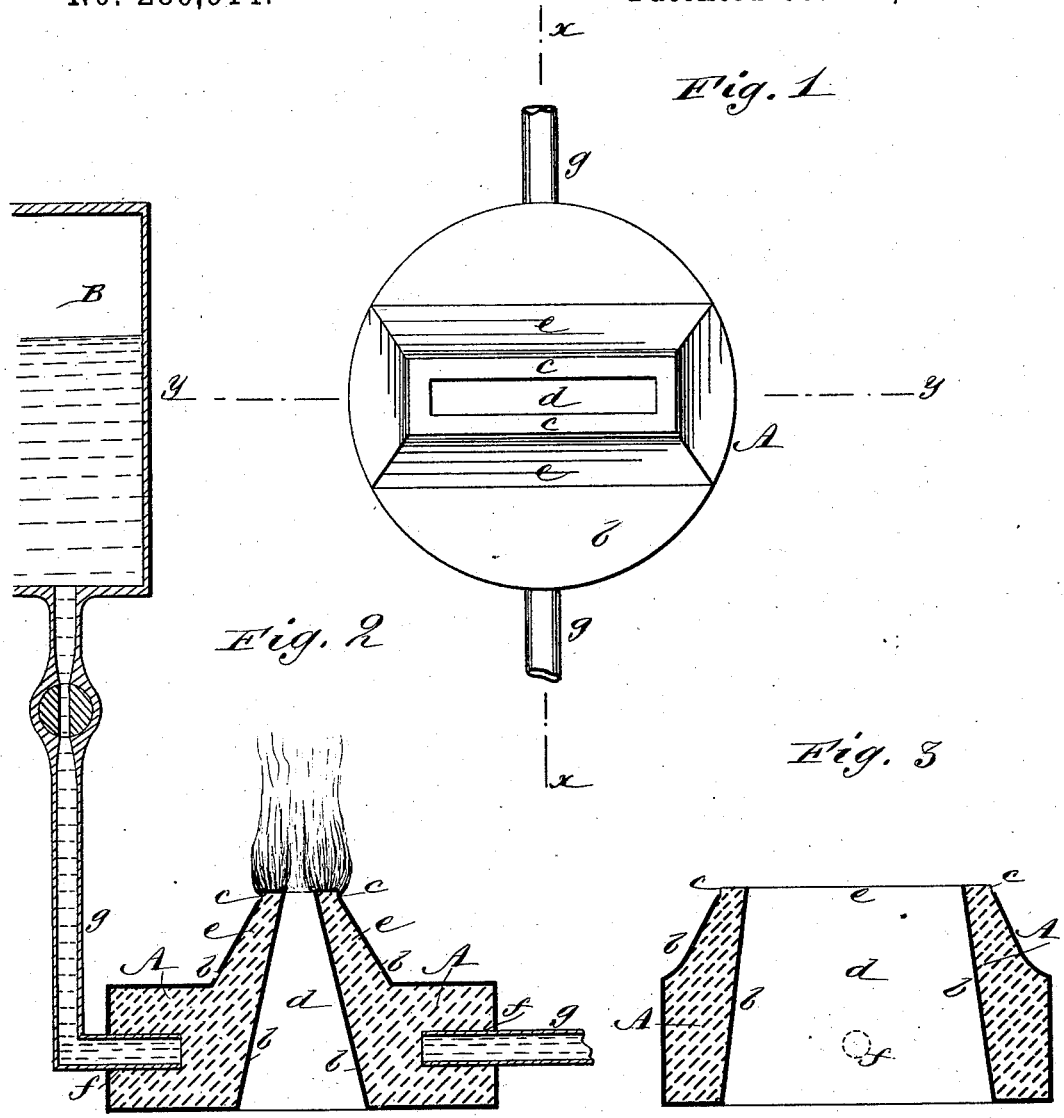
WITNESSES:
C. Neveux
C. Sedgwick
INVENTOR:
R. H. Dimock
J. A. Robinson
BY
ATTORNEYS.

ns* # UNITED STATES PATENT OFFICE.

ROBERT H. DIMOCK AND JOHN A. ROBINSON, OF NEW HAVEN, CONNECTICUT.

OIL-BURNER.

SPECIFICATION forming part of Letters Patent No. 286,914, dated October 16, 1883.

Application filed March 23, 1883. (No model.)

*To all whom it may concern:*

Be it known that we, ROBERT H. DIMOCK and JOHN A. ROBINSON, of the city and county of New Haven, and State of Connecticut, have invented a new Improvement in Oil-Burners, of which the following is a full, clear, and exact description.

This invention, which is applicable to cooking and other stoves, steam-boilers, heaters of various kinds, chandeliers, street-lamps, hand-lamps, and reservoir-lamps generally, relates to the use of any suitable volatile inflammable liquid, including naphtha, benzine, gasoline, camphene, petroleum, and other like liquids for producing light and heat, and in which the liquid that may be supplied under a head or pressure, as usual in fountain and other lamps, is conveyed for volatilization and combustion through a block or blocks of non-inflammable absorbent material and burned upon the exposed surface thereof.

The invention consists in a burner of novel construction for hydrocarbon-liquid fuels, substantially as hereinafter described, and whereby, unlike other porous blocks used for a like purpose, and varnished or coated in part to prevent evaporation, the unglazed combustion-surface is restricted to the top of a cone-shaped flame-tip forming an integral portion of the body of the burner, said tip having exterior inclined sides, to facilitate the passage of air to the flame, and the body and tip having an air-duct up through them, to give an interior supply of air to the flame, which is thus concentrated and made to burn clear with a flame of great intensity and heating-power, free from all smothering and choking over an extended surface of the porous block; and the invention further consists in a combination, with such a burner, of one or more liquid-fuel-supply pipes arranged to connect with the body of the burner, and to supply the liquid fuel thereto under a head or pressure, as hereinafter set forth.

Reference is to be had to the accompanying drawings, forming part of this specification, in which similar letters of reference indicate corresponding parts in all the figures.

Figure 1 represents a porous mass or burner of burned clay embodying our invention, and with tubular attachments for connecting it with a reservoir for supplying it with the inflammable liquid or fluid. Fig. 2 is a vertical section of the same on the line *x x* in Fig. 1, and showing the burner as connected with a liquid-supplying reservoir; and Fig. 3 is a vertical section on the line *y y* in Fig. 1.

A in the drawings is the burner, which may either be used singly or in concert with others, according to the purpose or use the invention is applied to. This burner is made by mixing a quantity of earthy or clayey material, in the condition of a dry and fine powder, with a certain amount of some minutely-subdivided combustible substance, and, after moistening the mass, molding or kneading it to a proper shape, and with suitable openings in it, after which the mass is subjected to sufficient heat to destroy the combustible substance within it, thereby leaving a dry and porous mass, which is afterward glazed or coated on its exterior surfaces with other material, *b*, of such a nature that, when properly heated, it fuses and closes the outer pores of said mass, to prevent exudation (excepting at its top *c*, which is left unglazed) of the liquid supplied to the porous mass or stone A, to keep up combustion. This mode of making the burner A is similar to that which has been practiced for making various fire torches or kindlers, and solid lamp-bodies of porous incombustible material for absorbing and containing within its pores the oil to be burned; but the burner which we produce is not designed to be first saturated with the oil or liquid fuel and to be dependent upon capillary attraction for keeping up the supply, as in the case of the fire torches or kindlers and lamps just referred to, but has its supply maintained by "head" or pressure from a reservoir, and consequently requires to have its pores much more uniform and different in degree from what is required for fire-torches, or where capillary attraction is to be relied upon for keeping up the supply of liquid. Certain stones, suitably glazed or enameled on their exterior surfaces, might be used for the burner A; but to meet the requirements as above stated—that is, to provide for the liquid being forced up through the burner by pressure from the reservoir, with which our burner is always designed to be connected—we find from experiment that potter's clay, prepared as follows, makes a very perfect material for the burner. Thus, for instance, we take of potter's clay six parts, and mix with the same four parts, by measure, of corn-meal, and, after thoroughly mixing, moisten the mass and beat or knead it in into a dough-like consistency. After this we mold or form the mass into a flat body or cake and pierce it with one or more perpendicular apertures, d, and raise the lips e e of such opening or openings above the surface of the body of the mass, to form a raised burner-mouth or cone-shaped flame-tip at such part, each aperture d being a central air-passage for an upcurrent of air through the burner to the flame, on the same principle as an Argand burner. The exterior sides of the cone-shaped flame-tip are set inclining or converging toward one another in an upward direction, to facilitate the passage of air to the flame, and the interior air-duct, d, is also made converging in an upward direction, to give a free supply of air from below, and to concentrate it, with a quickening effect, on the flame above. So soon as the porous mass thus formed has been thoroughly dried on a warm slab, or otherwise, it is placed in a kiln and baked at a white heat for thirty-six to forty-eight hours, more or less. It is then cooled and dipped in any suitable glaze or enamel, and again baked at a dull-red heat until the glaze fuses, to give it an enamel coating, b. We next pierce the side of the burner with one or more holes, f, preferably with opposite holes, to equalize and distribute the supply of the liquid fuel to the burner, and insert in the same the end of a tube or tubes, g, which, as shown for one of said tubes, connect with a reservoir, B, of any suitable size and shape, containing a supply of the liquid to be burned, and which may be anywhere arranged so as to feed under a head or pressure the liquid to the burner. The upper surface, c, of the raised mouth of the burner is then scraped, to remove the glaze or enamel b from the upper edges or surfaces, c, of the lips e e, forming a cone-shaped flame-tip, so that by simply applying a lighted match to the surface or surfaces c a constant flame is obtained without the aid of a wick.

We are aware that logs or bars of porous earthenware supplied with oil from a reservoir have been used for burning oils, and this we do not claim.

Having thus described our invention, we claim as new and desire to secure by Letters Patent—

1. A burner for hydrocarbon-liquid fuels, made substantially as herein shown and described, the same consisting of a block of non-inflammable liquid-absorbent material constructed with a cone-shaped flame-tip arranged to rise above the body of the block, said flame-tip having inclined interior sides to facilitate access of air to the flame, also constructed with an interior air-aperture extending up through the flame-tip, and the whole being glazed on its exterior and exposed sides, excepting the upper combustion-surface of the flame-tip, substantially as specified.

2. The combination, with an oil-absorbing non-inflammable block, of a flame cone or tip made integral with and rising above the block, with an air-opening made through the block and through the cone, substantially as herein shown and described.

ROBT. H. DIMOCK.
JOHN A. ROBINSON.

Witnesses:
CHARLES F. WOLLMANN,
OLIVER S. WHITE.